United States Patent
Delatorre et al.

(10) Patent No.: US 9,055,090 B2
(45) Date of Patent: Jun. 9, 2015

(54) NETWORK BASED DEVICE SECURITY AND CONTROLS

(75) Inventors: Renato J. Delatorre, Palisades Park, NJ (US); Paul Tuscano, Columbia, MD (US); Anthony Dennis, Flemington, NJ (US); Steven R. Rados, Danville, CA (US)

(73) Assignees: Verizon Patent and Licensing Inc., Basking Ridge, NJ (US); Cellco Partnership, Basking Ridge, NJ (US)

(*) Notice: Subject to any disclaimer, the term of this patent is extended or adjusted under 35 U.S.C. 154(b) by 119 days.

(21) Appl. No.: 13/494,735

(22) Filed: Jun. 12, 2012

(65) Prior Publication Data

US 2013/0333032 A1     Dec. 12, 2013

(51) Int. Cl.
*H04L 29/06* (2006.01)

(52) U.S. Cl.
CPC .............. *H04L 63/14* (2013.01); *H04L 63/145* (2013.01); *H04L 29/06911* (2013.01); *H04L 63/1441* (2013.01); *H04L 63/1408* (2013.01); *H04L 63/1416* (2013.01)

(58) Field of Classification Search
CPC ..... H04L 63/14; H04L 63/10; H04L 63/1408; H04L 63/1416; H04L 63/1441; H04L 63/145; H04L 29/06911
USPC .................. 726/22, 23, 24; 713/188; 709/224
See application file for complete search history.

(56) References Cited

U.S. PATENT DOCUMENTS

| | | | | |
|---|---|---|---|---|
| 6,704,874 | B1* | 3/2004 | Porras et al. ..................... | 726/22 |
| 7,363,656 | B2* | 4/2008 | Weber et al. ..................... | 726/23 |
| 7,665,135 | B1* | 2/2010 | Mohiuddin et al. ............ | 726/22 |
| 7,712,133 | B2* | 5/2010 | Raikar et al. ..................... | 726/23 |
| 7,950,045 | B2  | 5/2011 | Bogineni et al. | |
| 8,015,114 | B1* | 9/2011 | Nachenberg ..................... | 705/59 |
| 2003/0018903 | A1* | 1/2003 | Greca et al. .................... | 713/188 |
| 2003/0212910 | A1* | 11/2003 | Rowland et al. .............. | 713/201 |
| 2005/0050337 | A1* | 3/2005 | Liang et al. .................... | 713/188 |
| 2006/0282388 | A1* | 12/2006 | Solomon et al. ................ | 705/52 |
| 2007/0275741 | A1* | 11/2007 | Bian et al. ...................... | 455/466 |

(Continued)

OTHER PUBLICATIONS

"Network Access Protection," Wikipedia the free encyclopedia, retrieved Apr. 11, 2012. <http://en.wikipedia.org/wiki/Network_Access_Protection>.

(Continued)

*Primary Examiner* — Sarah Su

(57) ABSTRACT

Protection against security attacks involves monitoring network traffic for a computing device security attack and determining whether there is a security event, using one or more network based security tools. Next, it is determined whether an event pattern involving two or more security events meets a predetermined criteria. Upon determining that there is a security attack, corrective action is tailored, based on the type of the computing device, the operating system of the computing device, the type of security attack, and/or the available protection tools. A course of action is performed depending on whether an account of the computing device includes a security protection service. If there is a security protection service, a message is sent over a secure link to the computing device. This message includes the corrective action to cure the computing device from the security attack.

20 Claims, 4 Drawing Sheets

(56) References Cited

U.S. PATENT DOCUMENTS

| | | | |
|---|---|---|---|
| 2009/0293126 A1 | 11/2009 | Archer et al. | |
| 2009/0305687 A1* | 12/2009 | Baldan | 455/419 |
| 2010/0083378 A1* | 4/2010 | Cheswick | 726/23 |
| 2010/0154059 A1 | 6/2010 | McNamee et al. | |
| 2010/0162399 A1* | 6/2010 | Sheleheda et al. | 726/24 |
| 2010/0257598 A1* | 10/2010 | Demopoulos et al. | 726/13 |
| 2010/0313272 A1* | 12/2010 | Franczek et al. | 726/24 |
| 2012/0174219 A1* | 7/2012 | Hernandez et al. | 726/22 |
| 2012/0233656 A1* | 9/2012 | Rieschick et al. | 726/1 |
| 2012/0272320 A1* | 10/2012 | Rados et al. | 726/24 |
| 2013/0047257 A1* | 2/2013 | Aziz | 726/24 |
| 2013/0081138 A1* | 3/2013 | Rados et al. | 726/23 |

OTHER PUBLICATIONS

"How Kindsight Mobile Security Works," Kindsight, retrieved Apr. 11, 2012. <http://www.kindsight.net/en/serviceprovider/protecting-mobile-subscribers>.

Andreas Muller, "Master's Thesis: Event Correlation Engine" ETH Zurich, 2009.

"Mobile Security App+Network-based Detection=Complete Protection", Kindsight Mobile Security, 2012.

The Mobile Malware Problem: The question isn't "is it real?"—it's "what do we do about it", A Kindsight White Paper, 2012.

* cited by examiner

NETWORK BASED DEVICE SECURITY AND CONTROLS

BACKGROUND

Communication networks are undergoing a rapid evolution from circuit switched technologies, originally developed for voice communications to packet switched technologies. The packet technologies were originally developed for data communications, but as speed has increased and the technologies have evolved, the packet networks have been able to provide generic transport for all forms of information (voice, video, multimedia, text, etc.). However, as more and more communication applications have migrated to packet transport that was often intended for an open Internet application, they have become subject to many of the security issues that plague the public Internet. Malicious software (malware) and social engineering tactics are becoming of increasing concern.

Malware is software designed to disrupt the operation of a computing device, including personal computers (PCs) and mobile devices such as smart-phones, tablets, and personal digital assistants (PDAs). Malware includes viruses, worms, spyware, Trojans, adware, botnets, spambots, keyloggers, etc. For example, a Trojan is a malicious program hidden within a legitimate application. When activated, a Trojan allows criminals to gain unauthorized access to a user's computer (e.g., mobile device). A botnet is a collection of malware affected devices, ranging in size from a dozen to tens of thousands that can be coordinated by a Command and Control (C&C) server. A botnet can be used in spam, identity theft, or distributed denial of service (DOS) attacks. A spambot is an automated program that harvests personal contact information to send unsolicited email, short message service (SMS) or social media messages. A spambot may even decipher passwords and send its messages directly from a user's account. A keylogger captures passwords, usernames, bank account information, and credit card numbers typed into a computing device to later transmit the information back to the criminals.

Social engineering, in the context of computing device security, is the manipulation of users into performing actions or divulging confidential information. It is deception for the purpose of information gathering, fraud, or unauthorized computing device access. For example, a hacker may contact a system administrator and pretend to be a user who cannot get access to his or her system.

For simplicity, any form of malware or social engineering event or combination of events will be collectively called a "security attack" herein.

Traditionally, users have relied on anti-virus programs for protection. However, anti-virus programs provide limited protection. For example, the antivirus (AV) software may not be up to date or may even be circumvented by malware that is run in stealth mode. Further, hackers may exploit weaknesses of either the anti-virus programs or the Operating System (OS); or hackers may even use social engineering methods (discussed above) to fool a consumer to inadvertently install malware.

An Intrusion Detection System (IDS) is a device or software application that monitors network or system activities for malicious activities or policy violations and produces reports to a Management Station. Existing IDSs address security in a layered approach—at link layer, at network layer, and at the application layer—and at many points in the end-to-end path of service delivery. Network based security has the advantage in being an area where malware cannot hide. No matter how stealthy the malware on the infected computing device (e.g., PC or mobile device), standard IP protocol such as Domain Name Server (DNS), IP addressing, Transmission Control Protocol (TCP), and User Datagram Protocol (UDP) is generally used to communicate back "home" with the stolen digital information. Thus, a security attack uses the network to communicate with a Command and Control (C&C) server. Accordingly, infected computing devices use the same network that is generally used for legitimate purposes.

Intrusion Prevention Systems (IPS) extend IDS by additionally blocking traffic on the network that is suspected to be malware infected. However, what is missing is a system and method that leverages network based security intelligence, communicates the security attack to the device, and triggers corrective action on the device.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The various examples discussed below enable network based detection of a security attack with respect to a computing device. A network based approach helps prevent the propagation of malware. Network traffic is monitored for a computing device security attack. It is determined whether there is a security event using one or more network based security tools. Next, it is determined whether an event pattern of a plurality of security events meets a predetermined criteria. Upon determining that there is a security attack, corrective action is tailored, based on the type of the computing device, the operating system of the computing device, the type of security attack, and/or the available protection tools. A different course of action may be performed depending on whether an account of the computing device includes a security protection service. If there is a security protection service associated with the account, a message is sent over a secure link to the computing device. This message includes the corrective action to cure the computing device from the security attack.

Figure 1:
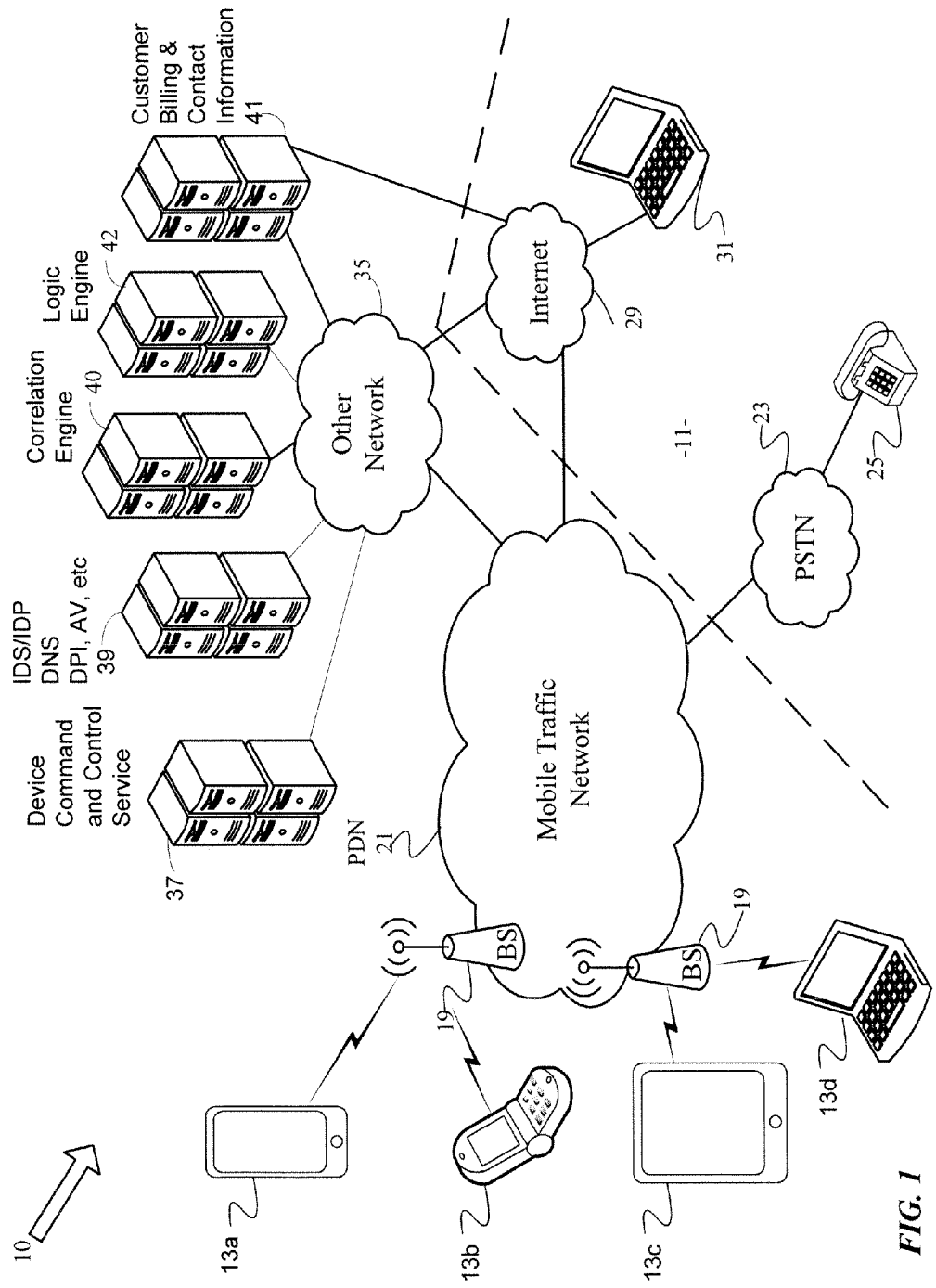
FIG. 1 illustrates a system providing a framework for network based protection services.

Reference now is made in detail to the examples illustrated in the accompanying drawings and discussed below. FIG. 1 illustrates a number of computing devices, a mobile traffic network coupled to other communication networks and several systems/elements associated with or included in the mobile traffic network for various functions as may be involved in monitoring security attacks on a computing device, determining a course of action for the particular computing device if malware is detected, and taking corrective action to cure the malware on the computing device. It will be understood that a mobile network is merely an example and that the concepts embodied herein can be used in any data network.

Hence, FIG. 1 illustrates a mobile communication system 10 as may be operated by a carrier or service provider to provide a wide range of mobile communication services and ancillary services or features to its subscriber customers and associated mobile device users. The elements generally indicated by the reference numeral 10 generally are elements of the network and are operated by or on behalf of the carrier, although the mobile devices typically are sold to the carrier's customers. The mobile communication system 10 provides communications between mobile devices as well as communications for the mobile devices with networks and stations outside the mobile communication system 10 as generally represented in the region 11 of FIG. 1.

For purposes of later discussion, several computing devices (e.g., 13a to 13d) appear in the drawing, to represent examples of the computing devices that may receive various services via the mobile communication system 10. Today, computing devices include mobile devices that take the form portable handsets, smart-phones, tablet computers, laptop or other portable personal computers (PCs) or personal digital assistants (PDAs), although they may be implemented in other form factors, including various types of consumer and business electronic devices. The computing devices 13a, 13b, 13c, and 13d, for example, may take the form of a mobile telephone station 13b, enhanced with display and user input capabilities to support certain text and image communications, such as email, picture communication and web browsing applications. Still further, enhanced mobile stations are now referred to as smart-phones, such as the touch screen smart-phone shown at 13a, or a tablets as shown in 13c in FIG. 1. For example, each mobile device 13a, 13b, 13c, or 13d includes a wireless transceiver compatible with the particular type of packet data service offered by the system 10.

As illustrated in FIG. 1, computing device 13d is a portable computer (PC). The PC may include a wireless transceiver compatible with the particular type of packet data service offered by the system 10, similar to any of those in the other types of mobile devices 13a-13c. Alternatively, the PC may connect to a handset device, similar to the handset or smart-phone type mobile device or may connect to a separate mobile data (only) device such as an air-card or data device or communicate over WiFi with a mobile hotspot. For discussion of one usage notification message example and the associated exemplary notification service, we assume that the mobile devices 13a, 13b, 13c, and 13d, are all covered under one subscriber account or account holder (AH).

The system 10 allows users of the computing devices to initiate and receive telephone calls to each other as well as through the public switched telephone network (PSTN) 23 and telephone stations 25 connected thereto. The system 10 allows SMS type text messaging between mobile devices and similar messaging with other devices via the Internet. The system 10 typically offers a variety of other data services via the Internet 29, such as downloads, web browsing, e-mail, etc. Computing devices connected through the internet (e.g., 31) to the network 35 are also protected by the security and control aspects discussed herein. For example, communication between computing device 13b and computing device 31 through the mobile network and interned is protected as well as communication between several computing devices and the internet 29.

The mobile communication system 10 typically is implemented by a number of interconnected networks. Hence, the overall system 10 may include a number of radio access networks (RANs), as well as regional ground networks interconnecting a number of RANs and a wide area network (WAN) interconnecting the regional ground networks to core network elements, such as the Multimedia Messaging Service Centers (MMSCs). A regional portion of the system 10, such as that serving mobile devices 13a to 13d typically includes one or more RANs and a regional circuit and/or packet switched network and associated signaling network facilities. However, these elements may be configured and/or interconnected in a variety of different ways, e.g. depending on the generation (2G, 3G, or 4G) of the mobile network technology.

Physical elements of a RAN, operated by one of the mobile service providers or carriers, include a number of base stations represented in the example by the base stations (BSs) 19. Such base stations 19 typically include a base transceiver system (BTS) which communicates via an antennae system at the site of base station and over the airlink with one or more of the computing devices 13a to 13d when the mobile devices are within range. Each base station 19 typically includes a BTS coupled to several antennae mounted on a radio tower within a coverage area often referred to as a "cell." The BTS is the part of the radio network that sends and receives RF signals to/from the mobile devices that the base station currently serves.

The radio access networks also include a traffic network represented generally by the cloud at 21, which carries the user communications for the mobile devices 13a to 13d between the respective base stations 19 and other elements with or through which the mobile devices 13a to 13d communicate. Individual elements such as switches and/or routers forming the traffic network 21 are omitted here for simplicity.

The traffic network portion 21 of the mobile communication system 10 connects to a public switched telephone network (PSTN) 23. This allows the system 10 to provide voice grade call connections between mobile devices and regular telephones connected to the PSTN 23. The drawing in FIG. 1 illustrates one such telephone at 25.

The traffic network portion 21 of the mobile communication system 10 connects to a public packet switched data communication network, such as the network commonly referred to as the "Internet" shown at 29. Packet switched communications via the traffic network 21 and the Internet 29 may support a variety of user services through the system 10, such as mobile device communications of text and multimedia messages, e-mail, web surfing or browsing, programming and media downloading (including audio and video), etc. For example, the mobile devices may be able to receive messages from and send messages to user terminal devices, such as personal computers, either directly (peer-to-peer) or via various servers (not separately shown). The drawing shows such user terminal devices as a personal computer (PC) or servers 31 and mobile PC 13d, by way of example. For purposes of discussing notification messages, some notifications may entail an e-mail message transmission of the notification to the account holder's terminal, such as to the PC 31 via the Internet 29.

The carrier also operates a number of systems that provide ancillary functions in support of the communications services provided through the system 10, and those elements communicate with other nodes/elements of the system 10 via one or more private IP type packet data networks 35 (sometimes referred to as an Intranet). These support elements, for example, include a device and control service (DCCS) 37, one or more network based malware detection elements (in malware detection server 39), a correlation engine 40, a logic engine 42, and customer account service server 41.

The malware detection server 39 may include one or more security tools. For example, server 39 may include an Intrusion Detection System (IDS), which monitors packet data communication traffic through the mobile traffic network 21 essentially looking for any abnormal network traffic pattern and reports any detected suspicious packets. An IDS does not stop malicious attacks. Instead, it reports such attacks (e.g., due to malware running on a computing device) to administrators via conventional methods, such as email, text messages, or graphical displays. Server 39 may include an Intrusion Detection and Protection (IDP), which is more proactive in stopping malicious attacks. For example, an IDP is intelligent in that it is able to learn and adapt. In this regard, an IDP database may be updated at any point to protect against the latest security threats proactively. An IDP can respond to a detected attack by stopping the attack itself, changing the security environment (e.g., reconfiguring a firewall), or changing the attack's content. For example, IDP and IDS programs can be implemented in hardware or in programs running on one computer, such as 39, or distributed on a number of computers configured as network connected servers.

Malware detection server 39 may also include other network based monitoring tools such as DNS Analysis, which detects malicious domains and other networks, Deep Packet Inspection (DPI), antivirus (AV), and other known malware systems and methods. Although a single server 39 is illustrated to include one or more malware detection elements, it will be understood that several servers may be used.

System 10 includes a Device Command and Control Service (DCCS) (i.e., server 37) that provides messages and/or instructions to a computing device (e.g., 13d) after it receives a notification from the logic engine 42 in connection with a security attack regarding a computing device (e.g., 13d). The logic engine 42 receives event information from the correlation engine 40 and the malware detection server 39 and uses the event information to determine appropriate corrective action for the particular computing device that is subject to each detected security event. Both the DCCS server 37 and the logic engine 42 are discussed in more detail later.

System 10 includes a correlation engine 40 that is used to determine whether there is a security attack that may have been missed by the malware detection server 39. For example, while the malware detection server 39 may identify a malware event (e.g., an assertive step consistent with malware), correlation engine 40 uses a signature comprising a combination of steps (e.g., events) to identify a security attack. Patterns that are common to a security attack are evaluated. For example, a signature may include a particular sequence of commands with little or no use to a normal program. While signatures based on malware indicia may be based on prior knowledge of malware (e.g., predefined criterion), new malware (or a new security attack in general) that has not been previously identified, can be identified as well. For example, when a computing device (e.g., 13a to 13d) sends data via the network 21, this data may be correlated against predetermined signatures in a database of the correlation engine 40. If the correlation matches identically to one of the signatures in the database, then a predefined criterion is met, rendering the data as a security attack and the computing device as possibly malware infected.

In another exemplary approach, malware is identified based on a degree of correspondence between the data from the computing device sent through the network 21 and one of the signatures in the database. If a predetermined threshold of correspondence is met, it is indicative that there is a strong likelihood that malware is present. A threshold could be a large number of concurrent connections to mail server in a short time frame from a single device where typically you would expect only a few connections over the same period, which would be indicative of a spambot. Additionally, a threshold could be the amount of network traffic a device generates over a short period of time after visiting a site that is known to house malware. Thus, the identification of malware may be based on a probabilistic determination that a correspondence between the data of the computing device on the mobile traffic network 21 is malware infected.

It may be helpful to describe both (i) the determination of a single security event, and (ii) the determination of a security attack based on a combination of events through the correlation engine in the context of examples.

Regarding a single security event, consider for example a phishing email message that is received on a computing device (e.g., laptop 13d) that purports to be from a financial institution. The message includes a link to a website that is configured to cause a computing device such as 13d to download malware onto the computing device 13d, to steal a user's financial records, and ultimately lead to identity theft. When the user clicks on the link, their browser sends a query to the Domain Name Service (DNS) server to receive the IP address for the URL in the embedded link. At this point, the malware detection server 39 (e.g., the DNS analysis tool) analyzes the information received from the computing device 13d and identifies the website as being one that hosts phishing scams. Accordingly, since the signature of the information (i.e., nefarious website) is consistent with a list of blacklisted websites stored in a database of the server 39 (i.e., predefined criterion), this is considered a single security event. The user may be warned of the security risk but may still be allowed to access the site. This event may be recorded and added to the respective client's records for further evaluation and/or notification of the client. Consider this as a first event.

Next, consider a computing device 13d receiving a request for information that the user believes is from their bank. The user unwittingly enters their personal information (e.g., financial) on a nefarious webpage. After filling out pages of information, the user is prompted to download an application. Again, the browser sends a DNS query to the DNS server. At this point, the malware detection server 39 (e.g., the DNS analysis tool) analyzes the information received from the computing device 13d and identifies the website to be one that hosts viruses and botnets. Consider this a second event.

Next, assume that the application is downloaded and installed on computing device 13d. Assume further that the malware manages to get past the resident anti-virus scans (e.g., they are out-dated). For example, the malware may be new, an application on the computing device 13d may fetch the malware, the malware detection function may rely on offline processing to detect sophisticated malware that may not be detected in real-time, and the like. The malware on the computing device 13d attempts to communicate with the DCCS 37 server over network 21. For example, the malware may try to fool the network 35 that it is not a malware attack. Indeed, the malware may try to gain control of the DCCS 37 server to infect additional computing devices. For this example, assume that the malware initiates sending the financial records found in a memory (e.g., hard drive, FLASH, etc.) of the computing device 13d. This communication is detected by the Intrusion Detection System (IDS) or Intrusion Prevention System (IPS) on the malware detection server 39. Consider this a third event.

The combination of the first, second, and third events may be detected as an event pattern that can now be identified by the correlation engine 40. For example, the Internet Protocol (IP) addresses for the three events together with the customer's identity (e.g., mobile device number (MDN) or phone number or own assigned IP address) are interpreted as a security attack, based on predetermined criteria in a database. In one example the criteria for an attack is predefined by security analysts (e.g., people trained and knowledgeable in network security matters).

Accordingly, the malware detection server 39 is configured to identify a malware event (e.g., an assertive step that is indicative of malware), while the correlation engine 40 uses a signature relating to a combination of events to identify a security attack. Any security attack detected by the malware detection server 39 and the correlation engine 40 is identified to a logic engine 42.

The logic engine 42 of system 10 receives event information from the correlation engine 40 and the malware detection server 39. Logic engine 42 uses the event information to determine appropriate corrective action for the particular computing device that is subject to each detected security event. The event information received by the logic engine 42 includes the nature of the security attack, the type of computing device affected and the account holder. For example, the nature of the security attack may include the type of malware or form of social engineering attack. The type of device may include the platform (e.g., tablet, pc, smart phone, etc.) and operating system (e.g., type and version). The logic engine 42 evaluates the event information, whether the computing device owner (e.g., account holder) has subscribed to any protection services and determines which available tool (if any) could cure the computing device (e.g., remediate the security attack). For example, there may be several levels of protection for a computing device against a security attack, ranging from a low level (e.g., where the incident is recorded); mid level (e.g., where the communication is blocked and the account holder notified); to high level (e.g., where the protection algorithms are frequently updated, communication is blocked, the account holder notified, and the computing device is cured of the security problem). The level of protection is based on account holder subscriptions to such protection service. In addition, there may be different levels of security threats (e.g., low, medium, or high).

System 10 includes a Device Command and Control Service (DCCS) (i.e., server 37) that provides messages and/or instructions to a computing device (e.g., 13d) after it receives a notification from the logic engine 42 in connection with a security attack regarding a computing device (e.g., 13d). For example, the notification includes instructions tailored for the level of protection service subscribed to and the specific computing device (tablet 13d in this example). Communication between the DCCS 37 and the computing device (e.g., 13d) is in a secure manner. Secure communication can be in different ways: (i) through standard communication methods using conventional approaches (e.g., push or pull), (ii) through reserved channel (e.g., SMS); or (iii) through a combination of the first two, based on the "business rules" of the mobile traffic network 21 provider.

A "push" communication is one in which the server (e.g., DCCS 37) has data to send and initiates the communication session and transmission of the data to the client. For example, mobile devices traditionally operate as clients with respect to service provider servers, and the mobile devices themselves initiate all data communications with the service provider servers. Essentially, the mobile client sends a request to a server to "pull" desired data down from the server to the mobile device. With such an approach, if a service provider or other server wants to send a notification or other data communication to a mobile device, the server must wait for the mobile device to establish a data communication connection with the server (e.g., DCCS 37). A quasi-push workaround, also known as an SMS wake up, relies on short message service (SMS) messages to provide the mobile device with a notification, or to cause the mobile device to establish a data communication connection with the server (e.g., DCCS 37) to pull down that the server is otherwise waiting to send to the mobile station. More recently, mobile carriers have developed a new modality to actually push messages to mobile devices, when the server (e.g., DCCS 37) has notifications or data to send to the mobile stations. With the new approach, a push server (e.g., DCCS 37) effectively holds hypertext transfer protocol (HTTP) connections to mobile devices open as persistent logical connections; and the push server sends messages asynchronously, in real time to the mobile stations through the persistent logical connections.

Thus, in a push messaging, a secure and persistent data connection between the computing device (e.g., 13d) and the server (e.g., DCCS 37) is established. When the DCCS 37 has a notification or data to send to the computing device (e.g., 13d), the secure and persistent connection enables the DCCS 37 to communicate with a client application on the computing device (e.g., 13d). In general, the secure and persistent connection is a logical connection through a mobile traffic network 21, such as a packet switched communication session through the network.

In contrast, with "pull" communication, the request for the transmission of information is initiated by the client (e.g., computing device 13d). For example, an application on the computing device 13d contacts the DCCS 37 for a protection software update.

A wireless carrier may use SMS messaging to communicate with a computing device (e.g., 13d) on their network. The SMS channel has a separate signaling resources from those of the voice/data channels.

Firmware Over-the-Air (FOTA) update technology may be used for security upgrades (e.g., malware protection software) of a computing device (e.g., 13d) to introduce new security services or enhance existing security capabilities. Of course, such software updates can also be performed by connecting the computing device via cable to a PC 31. Accordingly, secure software updates over the mobile traffic network 21 or the internet 29 from the DCCS 37 are provided.

In one example, the computing device (e.g., 13d) authenticates the command sent to it from an authorized DCCS 37. In this regard, the computing device manufacturer and the carrier both provide certificates and keys to the computing device (e.g., 13d) and the DCCS 37 such that the communication between the computing device 13d and the DCCS 37 is secure over the control channel. For example, the computing device 13d determines whether DCCS 37 is authorized to communicate with it.

There is also a hybrid message method, which is a combination of the push and SMS. For example, the application on the computing device (e.g., 13d) registers with an SMS service provider; but instead of maintaining a constant connection to the service provider, it simply listens for a signal sent to the computing device (e.g., 13d) from the service provider. Through this approach, battery power of the computing device (e.g., 13d) is conserved.

It will be understood that other communication means between the DCCS and the computing device (e.g., 13d) can be used as well, such as the polling method, where the application simply checks in with the service at specific intervals. For example a memory of the computing device has a malware protection program stored in it that periodically samples the DCCS 37 for security updates.

In one example, system 10 includes a Customer Relationship Manager (CRM) 41, which is coupled for communication via the private network 35. The CRM 41 may include a variety of information and services related to the subscribers' account, such as billing information, data usage, on-line payment option, security subscription level, password control, etc. Of note for purposes of the present discussion, CRM server 41 receives information from the correlation engine 40 and the logic engine 42, and stores the information in a record for the respective account. The information from the correlation engine 40 and the logic engine 42 may include the nature of the security attack, the date and time of the security attack, the type of security attack (e.g., specific malware or form of social engineering attack), the platform (e.g., tablet, pc, smart phone, etc.), and operating system (e.g., type and version). Server 41 includes subscription related information about the security protection service (e.g., as to whether or not a security protection service is associated with the account of a particular computing device). The CRM server 41 may provide a subscriber interface via the Internet. Hence, a user's terminal, such as PC 31, may be used to access on-line information about a subscriber's account, which the mobile carrier makes available via the carrier's web site accessible through the Internet 29. In one example, the account information includes the date and time of security attacks and what (if any) action was taken in response to the security attacks.

In one example, the CRM 41 itself sends one or more notification messages to a computing device (e.g., 13d). The notification from the CRM 41 should not be confused with the notifications from the DCCS 37. The CRM 41 provides notifications based on logic or 'business rules' regarding various types of usage, services and what is preferred by the various subscribers. For example, CRM 41 may provide a notification over the mobile traffic network 21 to the computing device 13d that the subscriber usage limit has been exceeded or that a password or other account parameter has been change.

It will be understood that in order to provide effective security attack notification services, (e.g., date/time of a security attack, protection plan subscription level, recommended corrective action, etc.) for a large number of customers and a large volume of trigger events, the CRM 41 for the associated example of usage notification service and other enterprise applications requiring notification may utilize a distributed system architecture. Further, although each support element (e.g., 37, 39, 40, 41, and 42) is illustrated as a separate server herein, it will be understood that a single server can be configured to perform the functions of all the elements, or a single element may use several servers.

Figure 2:
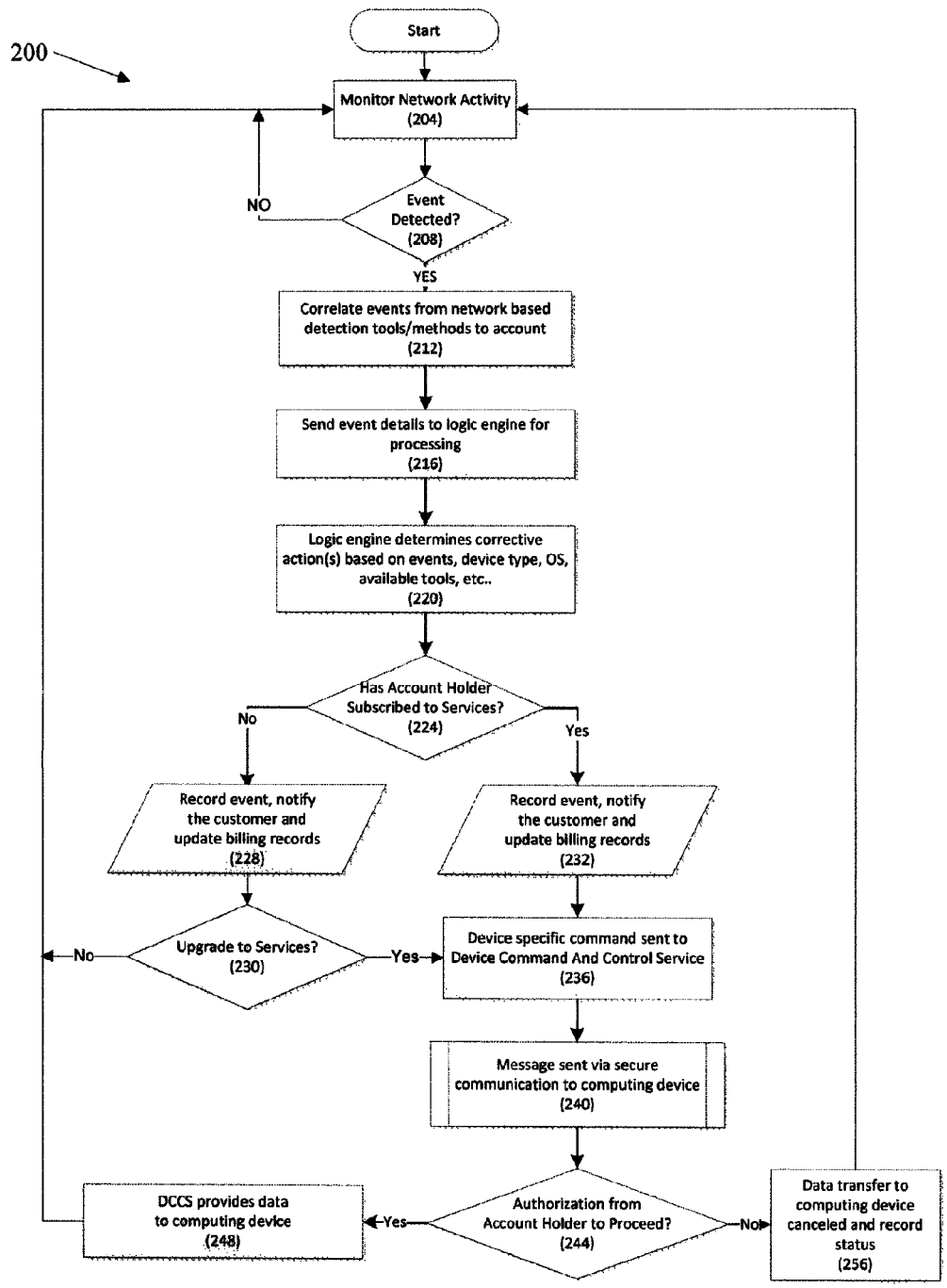
FIG. 2 illustrates a flowchart of an exemplary process for detecting security attacks at a network level.

With the foregoing overview of the system 10, it may be helpful now to consider a high-level discussion of an example of a network based computing device security and control. FIG. 2 illustrates a flowchart of an exemplary process 200 for detecting security attacks on a network level. In step 204 the network traffic (e.g., mobile traffic network 21) is monitored for security attacks. For example, the malware detection server 39 may include an IDS, IDP, DNS analysis, DPI, AV, and the like. Any single malware detection tool or any combination thereof may be used in this step to determine if there is a security event.

Monitoring by the malware detection server is continuous (i.e., step 208). When an event is detected by the malware detection server 39, the event information (e.g., type, date/time, etc.) are sent to the correlation engine (i.e., server 40). Next, in step 212 the correlation engine 40 correlates the IP address(es) associated with an event, or combination of events (e.g., event pattern), with an account holder's identity (e.g., MDN or phone number). In one example, the signature of an event pattern is compared to predetermined criteria stored in a database of the correlation engine 40. In one example, an exact correspondence between the signature of the event pattern and the signature stored in the database is not required; rather, a security attack is identified based on a degree of correspondence (rather than exactly meeting all of the events that form the pattern, meeting a majority of them—e.g., meeting all of the events except sending personal information to a known address). For example, if a predetermined threshold of correspondence is met, it is indicative that there is a strong likelihood that malware is present. Thus, the identification of a security attack may be based on a probabilistic determination.

In step 216, the event information from the malware detection server 39, and the correlation engine 40 is sent to the logic engine 42. Logic engine 42 uses the event information to determine appropriate corrective action for the particular computing device (i.e., step 220). The event information received by the logic engine 42 includes the nature of the security attack and the type of computing device affected. In one example, the level of security threat (e.g., low, medium, or high) is also included. Based on this information, the logic engine 42 determines which available tool, configuration settings (e.g., on a mobile device), or operating system settings (e.g., on a personal computer) could be adjusted (if any) to cure the computing device (e.g., remediate the security attack).

In step 224 the logic engine 42 determines whether the account holder of the computing device has subscribed to any protection service. In one example, the logic engine 42 also determines whether the level of protection subscribed by the account holder is high enough for the determined action. Upon determining that the account holder has subscribed to a protection service (or high enough level of protection service), the information obtained from the logic engine 42 is recorded in the Customer Relationship Manager (CRM) server 41 (i.e., step 232). In one example, the account holder is sent a notification that a security attack has occurred. For example, this notification may be initiated by the CRM 41 (or the customer account service server 43, depending on the particular configuration of the service provider). Further, the CRM 41 of the respective account is updated to include the security attack information (e.g., date/time of the security attack (and/or each event collectively comprising a security attack), the type of the event, and the specific action that should be taken).

In step 236 the logic engine 42 provides the DCCS 37 tailored message for the computing device with respect to the security attack. For example, the message includes contact information of the affected computing device (e.g., MDN) and the action to be performed on the affected computing device. In step 240, there is secure communication between the DCCS 37 and the computing device. Secure communication has been discussed before and will not be repeated here for brevity. The message sent to the computing device by the DCCS 37 is based on the security attack and the available tools. In one example (step 244), authorization is requested from the computing device (e.g., the account holder or user) to perform the corrective action. When no authorization is received, no corrective action is performed (i.e., step 256). In one example, the lack of authorization is recorded in the CRM server 41 for the respective account. The method continues with monitoring network activity (i.e., step 204).

On the other hand, if in step 244 authorization is received from the account holder (or computing device user), in step 248 the DCCS 37 communicates with the computing device to perform the corrective action. In one example, a protection application on the computing device is activated (e.g., virus/malware application). If the protection application is not up-to-date, an update is performed. If the appropriate protection application does not exist on the computing device, the DCCS 37 provides the protection application over the secure communication link.

In one example, the authorization step 244 is skipped. Accordingly, the DCCS 37 communicates with the computing device over a secure communication link to perform the corrective action (e.g., to remove the malware) when it receives the message (e.g., instructions) from the logic engine 42, without waiting for authorization from the computing device.

Referring back to step 224, if on the other hand it is determined that the account holder has not subscribed to any protection for a computing device against a security attack (or a high enough level of protection), complete corrective action is not performed. Instead, in step (i.e., step 228), the account holder is sent a notification that a security attack has occurred. For example, this notification may be provided by the CRM 41. Further, the CRM 41 of the respective account is updated to include the security attack information (e.g., date/time of the security attack (and/or each event collectively comprising a security attack), the type of the event, and the specific action that should be taken).

For example, the notification from the DCCS 37 to the computing device includes a message that there has been a security attack on the computing device. It should be noted that this notification may be through e-mail, SMS message, and/or phone call to the account holder (and/or to the device user), depending on the predetermined preferences of the account holder, the service provider, or an account holder (who may or may not be the computing device user—e.g., a parent or relative of the computing device user). For example, the notification message may be provided on a user interface of the computing device. The notification message may be provided in the form of a visual or an audible prompt. In one example, the notification is provided as a pop-up on the user interface of the computing device.

In one example, the notification message of the security attack may allow the user (e.g., account holder) to upgrade to an appropriate a protection service (e.g., a higher level) to be able to cure the security attack on the computing device (i.e., step 230). Thus, a user may update their protection service by selecting a different plan from the provider. In one example, when the protection service is upgraded, the CRM 41 is updated to record the upgrade for the respective account. The method continues with step 236, where the DCCS 37 initiates communication with the computing device.

The notification from the DCCS 37 or the CRM 41 may be a message (e.g., pop-up) on a display of the computing device, an audible tone, a haptic signal, or any combination thereof. Each of the various notifications may be provided for a predetermined amount of time, which may vary depending on the type of notification, and may repeat intermittently as desired. The amount of time, repetition rate, type of notification and/or characteristics of the notification (e.g., display, tone, volume, vibration) may also vary depending on the severity of the security attack.

Figure 3:
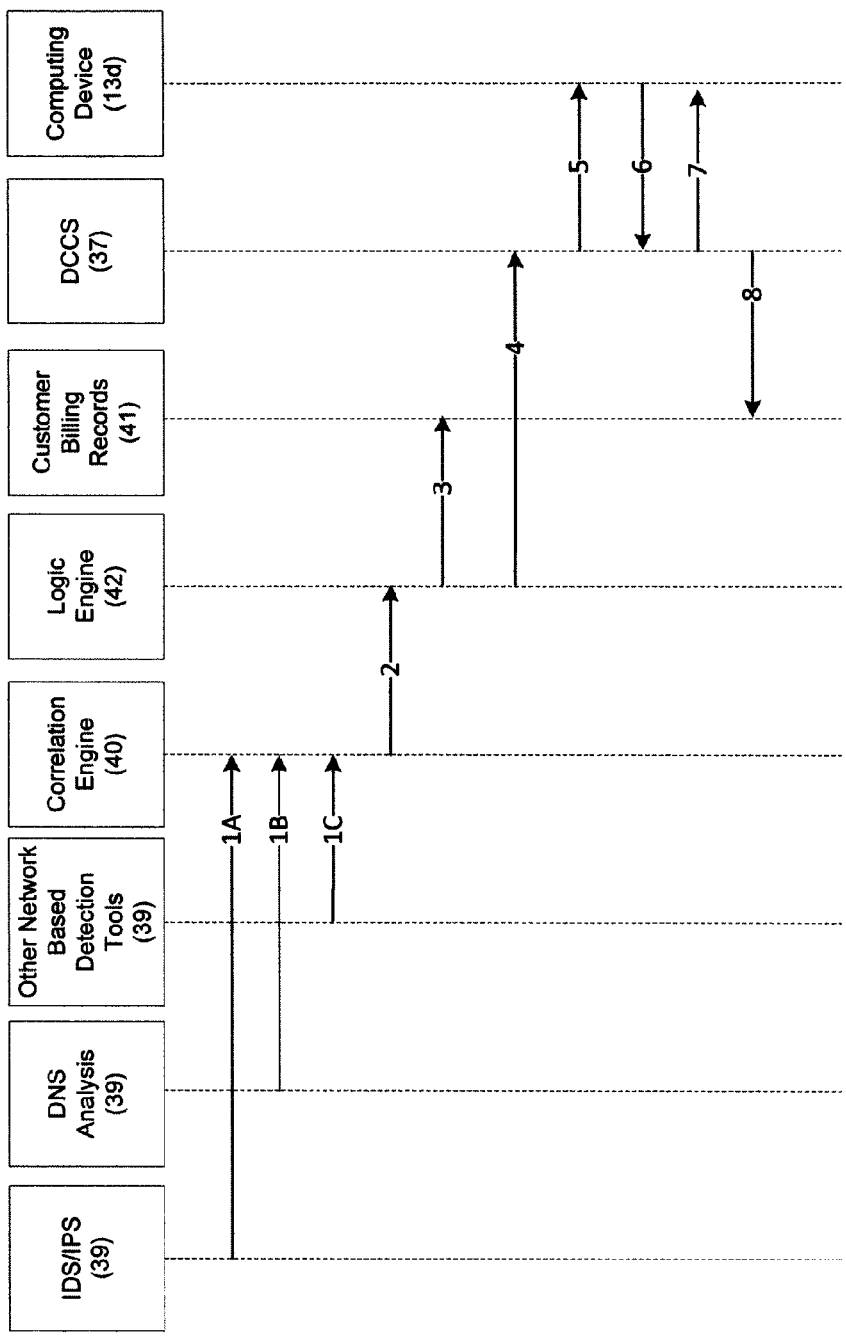
FIG. 3 illustrates an exemplary call flow of network based security and control of a computing device.

FIG. 3 illustrates a simplified exemplary call flow of network based security and control of a computing device. In steps 1A to 1C malware is detected and sent to the correlation engine 40. For example, the malware detection may include an IDS, IDP, DNS analysis, client based anti-malware and/or other network based detection tools which may be on a single server (e.g., 39) or several servers. Thus, any single malware detection tool or any combination thereof may be used in this step to determine if there is a malware event.

Next, in step 2 the correlation engine 40 correlates the IP address(es) associated with an event, or combination of events (e.g., event pattern), with an account holder's identity (e.g., MDN or phone number). The identification of a security attack may be a match with a stored signature or based on a probabilistic determination. The event information is sent to the logic engine 42.

In step 3, the logic engine 42 uses the event information to determine appropriate corrective action for the particular computing device. The event information includes the nature of the security attack and the type of computing device affected. In one example, the level of security threat (e.g., low, medium, or high) is also included. Based on this information, the logic engine 42 determines which available tool (if any) could cure the computing device and/or remediate the security attack. The logic engine 42 determines whether the account holder of the computing device has subscribed to any protection service. In one example, the logic engine 42 also determines whether the level of protection subscribed by the account holder is high enough for the corrective action to be performed. Upon determining that the account holder has subscribed to a protection service (or high enough level of protection service), the information obtained from the logic engine 42 is recorded in the CRM 41. Further, the CRM 41 of the respective account is updated to include the security attack information (e.g., date/time of the security attack (and/or each event collectively comprising a security attack), the type of the event, and the action that should be taken).

In step 4 the logic engine 42 provides the DCCS 37 tailored message for the computing device with respect to the security attack. For example, the message includes contact information of the affected device (e.g., MDN) and the action to be performed on the affected computing device.

In step 5, there is secure communication between the DCCS 37 and the computing device. The message sent to the computing device 13*d* by the DCCS 37 is based on the type of security attack and the available tools. In one example, authorization is requested from the computing device (e.g., the account holder or user) to perform the corrective action. When no authorization is received, no corrective action is performed. The lack of authorization may be recorded in the CRM server 41 for the respective account (not shown in a separate step).

Upon receiving authorization (i.e., step 6) from the computing device, the DCCS 37 communicates with the computing device (i.e., step 7) to perform the corrective action. In step 8, the CRM 41 receives the status information from the DCCS 37. For example, the status information includes the time/day the computing device was cured of the security attack.

As discussed in the context of FIG. 2, in one example, the authorization step 5/6 is skipped. Thus, after step 4, the DCCS 37 communicates with the computing device over a secure communication link to perform the corrective action when it receives the information (e.g., instructions) from the logic engine 42 (i.e., step 7).

As shown by the above discussion, functions relating to the network based monitoring and detection of a security attack with respect to a computing device and the associated control of corrective action may be implemented on computers connected for data communication via the components of a packet data network (in a mobile network context in our example), operating as one or more of the servers 37-42 as shown in FIG. 1. Although special purpose devices may be used, such devices also may be implemented using one or more hardware platforms intended to represent a general class of data processing device commonly used to run "server" programming so as to implement the respective security or accounting related functions discussed above, albeit with an appropriate network connection for data communication.

Figure 4:
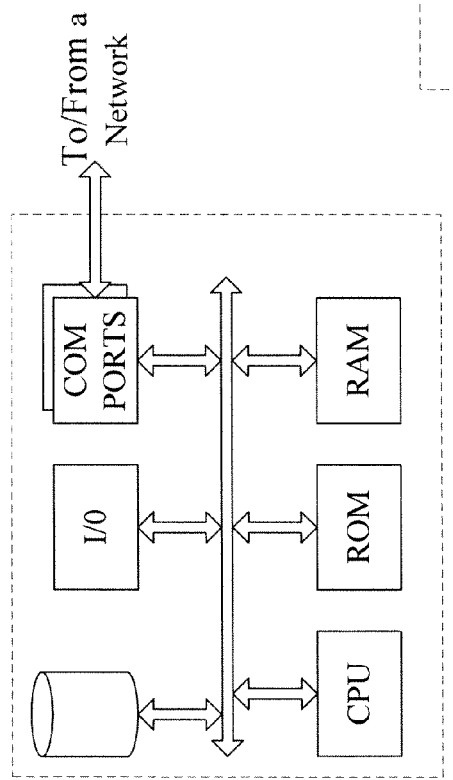
FIG. 4 illustrates a network or host computer.
Figure 5:
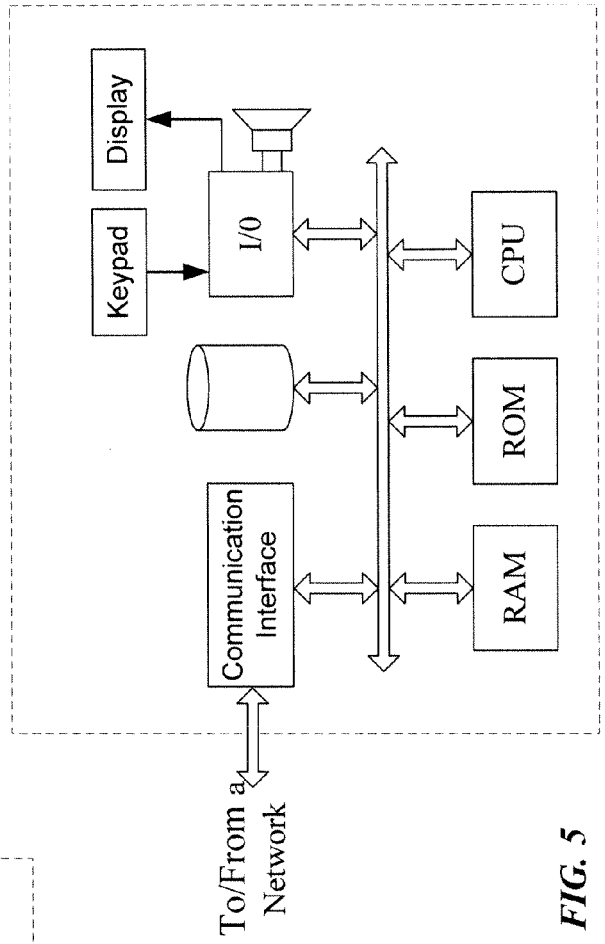
FIG. 5 depicts a computer with user interface elements.

FIGS. 4 and 5 provide functional block diagram illustrations of general purpose computer hardware platforms. FIG. 4 illustrates a network or host computer platform, as may typically be used to implement a server. FIG. 5 depicts a device with user interface elements, as may be used to implement a personal computer or workstation, such as computing devices 13d and 31, although the device of FIG. 5 may also act as a server if appropriately programmed. It is believed that the general structure and general operation of such equipment as shown in FIGS. 4 and 5 should be self-explanatory from the high-level illustrations.

A general purpose computer configured as a server, for example, includes a data communication interface for data communication. The server computer also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, although the specific programming configures the platform to perform the respective server functions as discussed herein. Of course, the server functions may be implemented in a distributed fashion on a number of similar platforms, to distribute the processing load. In this case, such a platform or platforms would run programming, for example, for DCCS 37, for malware detection server 39, for correlation engine 40, for logic engine 42, and/or for CRM 41 in FIG. 1.

A computer type user terminal device, such as a PC or tablet computer, similarly includes a data communication interface CPU, main memory and one or more mass storage devices for storing user data and the various executable programs (see FIG. 5). A mobile device type user terminal (i.e., computing device) may include similar elements, but will typically use smaller components that also require less power, to facilitate implementation in a portable form factor. The various types of user terminal computing devices will also include various user input and output elements. A computer, for example, may include a keyboard and a cursor control/selection device such as a mouse, trackball, joystick or touchpad; and a display for visual outputs. A microphone and speaker enable audio input and output. Some smart-phones include similar but smaller input and output elements. Tablets and other types of smart-phones utilize touch sensitive display screens, instead of separate keyboard and cursor control elements. The hardware elements, operating systems and programming languages of such user terminal devices also are conventional in nature, and it is presumed adequately familiar.

The software functionalities involve programming, including executable code as well as associated stored data and content related to protection services. The software code is executable by the general-purpose computer that functions as the server and/or that functions as a client computing device. In operation, the code is stored within the general-purpose computer platform. At other times, however, the software may be stored at other locations and/or transported for loading into the appropriate general-purpose computer system. Execution of such code by a processor or central proceeding unit of the computer platform enables the platform to implement the technique of determination of any form of malware or security attack described herein, in essentially the manner performed in the implementations discussed and illustrated herein.

Hence, aspects of the methods of protecting a computing device from security attacks outlined above may be embodied in programming. Program aspects of the technology may be thought of as "products" or "systems of manufacture" typically in the form of executable code and/or associated data that is carried on or embodied in a type of non-transitory machine readable medium.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. For example, although ranges such as "low," "medium," and "high" are discussed herein, it will be understood that other resolutions can be used as well.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, system, or apparatus that comprises a list of elements does not include only those elements but may include other elements not expressly listed or inherent to such process, method, system, or apparatus. An element proceeded by "a" or "an" does not, without further constraints, preclude the existence of additional system elements in the process, method, system, or apparatus that comprises the element.

The components, steps, features, objects, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits and advantages. These also include embodiments in which the components and/or steps are arranged and/or ordered differently.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Appendix Acronym List

The description above has used a large number of acronyms to refer to various services, messages, and system components. Although generally known, use of several of these acronyms is not strictly standardized in the art. For the convenience of the reader, the following list correlates terms to acronyms, as used by way of example in the detailed description above.

AH—Account Holder
AV—Antivirus
BS—Base Station
BTS—Base Transceiver System
C&C—Command and Control
CPU—Central Processing Unit
DCCS—Device Command and Control Service
DNS—Domain Name Server
DOS—Denial of Service
DPI—Deep Packet Inspection
DVD—Digital Video Disc
DVD-ROM—Digital Video Disc Read Only Memory
EEPROM—Electrically Erasable Programmable Read Only Memory
FOTA—Firmware Over The Air
IDS—Intrusion Detection System
IDP—Intrusion Detection and Protection
IP—Internet Protocol
IPS—Intrusion Prevention System
MDN—Mobile Device Number
MMSC—Multimedia Messaging Service Center
OS—Operating System
PC—Personal Computer
PDA—Personal Digital Assistant
PROM—Programmable Read Only Memory
PSTN—Public Switched Telephone Network
RAM—Random Access Memory
RAN—Radio Access Network
ROM—Read Only Memory
SMS—Short Message Service
TCP—Transmission Control Protocol
UDP—User Datagram Protocol
WAN—Wide Area Network

What is claimed is:

1. A method, comprising steps of:
monitoring, by one or more servers in a network, network traffic of the network for a security attack with respect to a computing device, the one or more servers including a malware detection element, a correlation engine, a logic engine and a device command and control service (DCCS) element, the monitoring comprising:
  determining, by the malware detection element, from the monitored network traffic whether there is a security event with respect to the computing device, using one or more network based security event detection tools;
  determining, by the correlation engine, whether an event pattern of a plurality of security events identified by the one or more network based security event detection tools meets a predetermined criteria; and
  detecting, by the logic engine, the security attack with respect to the computing device based on either a security event detection by the malware detection element or an event pattern detection by the correlation engine;
responsive to the detected security attack, determining, by the logic engine, a corrective action to take for the computing device, the corrective action tailored based on at least one of:
  (i) a type of the computing device;
  (ii) an operating system of the computing device;
  (iii) a type of the detected security attack; or
  (iv) available security attack protection tools;
determining, by the logic engine, whether an account of the computing device includes a security attack protection service; and
sending, by the DCCS element, a message over a secure communication link through the network to the computing device when the logic engine determines that the account includes the security attack protection service, the message including instructions that trigger an application program configured to cure malware on the computing device to automatically implement the tailored corrective action.

2. The method of claim 1, wherein the network based security tools perform at least one of:
  (i) intrusion detection system (IDS) security;
  (ii) intrusion detection and protection (IDP) security;
  (iii) domain name server (DNS) security;
  (iv) deep packet inspection (DPI) security;
  (v) anti-malware security; and
  (vi) social engineering tactics analysis.

3. The method of claim 1, wherein the determining whether the event pattern of the plurality of security events identified by the one or more network based security event detection tools meets the predetermined criteria is based on a threshold of correspondence between the event pattern of the plurality of security events and the predetermined criteria.

4. The method of claim 1, further comprising a step of notifying an account holder of the computing device that the security attack has occurred.

5. The method of claim 1, wherein the DCCS element, prior to sending the message, at least one of:
  determines whether the application program exists on the computing device and provides the application program to the computing device over the secure communication link when the application program does not exist on the computing device; or
  determines whether the application program on the computing device is up-to-date and provides an updated application program to the computing device over the secure communication link when the application program on the computing device is not up-to-date.

6. The method of claim 1, further comprising:
determining whether the security attack protection service included in the account of the computing device is capable of implementing the tailored corrective action;
sending a notification through the network to the computing device indicating the detected security attack without providing the tailored corrective action in response to determining that the security attack protection service is not capable of implementing the tailored corrective action; and
updating the account to indicate the detected security attack and the tailored corrective action that should be taken in response to determining that the security attack protection service is not capable of implementing the tailored corrective action.

7. The method of claim 1, further comprising:
sending, by the logic engine, a tailored message to the DCCS element when the account includes the security attack protection service, the tailored message including contact information of the computing device and the tailored corrective action,
wherein the DCCS element sends the message to the computing device responsive to the tailored message received from the logic engine.

8. A method, comprising steps of:
monitoring, by one or more servers in a network, network traffic of the network for a security attack with respect to a computing device, the one or more servers including a malware detection element, a correlation engine, a logic engine and a device command and control service (DCCS) element, the monitoring comprising:
determining, by the malware detection element, from the monitored network traffic whether there is a security event with respect to the computing device, using one or more network based security event detection tools;
determining, by the correlation engine, whether an event pattern of a plurality of security events identified by the one or more network based security event detection tools meets a predetermined criteria; and
determining, by the logic engine, whether the security attack is detected with respect to the computing device based on either a security event detection by the malware detection element or an event pattern detection by the correlation engine;
upon determining, by the logic engine, that there is no security attack, going back to the step of monitoring the network traffic for the security attack;
otherwise, when the security attack is detected:
determining, by the logic engine, a corrective action to take for the computing device, the corrective action tailored based on at least one of:
(i) a type of the computing device;
(ii) an operating system of the computing device;
(iii) a type of the detected security attack; or
(iv) available security attack protection tools;
determining, by the logic engine, whether an account of the computing device includes a security attack protection service;
taking, by the logic engine, a first course of action when the account of the computing device does not include the security attack protection service to indicate the detected security attack; and
taking, by the logic engine, a second course of action different from the first course of action when the account of the computing device includes the security attack protection service, the second course of action comprising:
causing the DCCS element to send a message over a secure communication link through the network to the computing device, the message including instructions that trigger an application program configured to cure malware on the computing device to automatically implement the tailored corrective action.

9. The method of claim 8, wherein the network based security tools perform at least one of:
(i) intrusion detection system (IDS) security;
(ii) intrusion detection and protection (IDP) security;
(iii) domain name server (DNS) security;
(iv) deep packet inspection (DPI) security;
(v) anti-malware security; and
(vi) social engineering tactics analysis.

10. The method of claim 8, wherein the determining whether the event pattern of the plurality of security events identified by the one or more network based security event detection tools meets the predetermined criteria is based on a threshold of correspondence between the event pattern of the plurality of security events and the predetermined criteria.

11. The method of claim 8, wherein the taking the first course of action comprises notifying an account holder of the computing device that the security attack has occurred.

12. The method of claim 11, wherein the taking the first course of action further comprises:
sending a notification over the network to the computing device, the notification including an option to upgrade the account of the computing device to include security attack protection; and
upon obtaining authorization to upgrade the account to include the security attack protection, taking the second course of action.

13. The method of claim 12, wherein the notification is at least one of a pop-up-message for presentation on a display of the computing device, an audible tone, a haptic signal, or any combination thereof.

14. The method of claim 13, wherein a type of the notification depends on a severity of the detected security attack.

15. The method of claim 8, the second course of action further comprising storing the application program on the computing device.

16. The method of claim 8, the second course of action further comprising receiving authorization from an account holder to take the second course of action prior to performing the tailored corrective action.

17. A system comprising one or more server computers, each server computer comprising a processor, a network interface coupled to the processor configured to enable communications via a communication network and a storage device for content and programming; wherein:
the programming configures the one or more server computers to implement:
a device command and control service (DCCS) element;
a malware detection element;
a correlation engine;
a logic engine; and
a customer service element, and
the programming configures the one or more server computers so that the system performs functions, including functions to:

monitor, by the one or more server computers, network traffic for a security attack with respect to a computing device, the monitoring comprising:
- determine, by the malware detection element, from the monitored network traffic whether there is a security event with respect to the computing device, using one or more network based security event detection tools;
- determine, by the correlation engine, whether an event pattern of a plurality of security events identified by the one or more network based security event detection tools meets a predetermined criteria; and
- detect, by the logic engine, the security attack with respect to the computing device based on either a security event detection by the malware detection element or an event pattern detection by the correlation engine;

responsive to the detected security attack, determine, by the logic engine, a corrective action to take for the computing device, the corrective action tailored based on at least one of:
- (i) a type of the computing device;
- (ii) an operating system of the computing device;
- iii) a type of the detected security attack; or
- (iv) available security attack protection tools;

determine, by the logic engine, whether an account of the computing device includes a security attack protection service; and send, by the DCCS element, a message over a secure communication link through the communication network to the computing device when the logic engine determines that the account includes the security attack protection service, the message including instructions to that trigger an application program configured to cure malware on the computing device to automatically implement the tailored corrective action.

18. The system of claim 17, wherein the network based security tools perform at least one of:
(i) intrusion detection system (IDS) security;
(ii) intrusion detection and protection (IDP) security;
(iii) domain name server (DNS) security;
(iv) deep packet inspection (DPI) security;
(v) anti-malware security; and
(vi) social engineering tactics analysis.

19. The system of claim 17, wherein the determination whether the event pattern of the plurality of security events identified by the one or more network based security event detection tools meets the predetermined criteria is based on a threshold of correspondence between the event pattern of the plurality of security events and the predetermined criteria.

20. The system of claim 17, wherein the system further performs the function to notify an account holder of the computing device that the security attack has occurred.

* * * * *